United States Patent
Zhu et al.

(10) Patent No.: US 11,258,713 B2
(45) Date of Patent: Feb. 22, 2022

(54) POLICY-BASED PROXIMITY ROUTING

(71) Applicant: VMware, Inc., Palo Alto, CA (US)

(72) Inventors: Hongwei Zhu, Mountain View, CA (US); Dileep Devireddy, San Jose, CA (US); Ganesan Chandrashekhar, Campbell, CA (US); Feng Gu, Mountain View, CA (US); Sreenivas Duvvuri, San Ramon, CA (US); Chidambareswaran Raman, Sunnyvale, CA (US); Nithin Bangalore Raju, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 22 days.

(21) Appl. No.: 16/886,540

(22) Filed: May 28, 2020

(65) Prior Publication Data

US 2021/0314265 A1  Oct. 7, 2021

Related U.S. Application Data

(60) Provisional application No. 63/005,982, filed on Apr. 6, 2020.

(51) Int. Cl.
*H04L 12/813* (2013.01)
*H04L 29/12* (2006.01)
*H04L 29/06* (2006.01)
*H04L 29/08* (2006.01)
*H04L 47/20* (2022.01)
(Continued)

(52) U.S. Cl.
CPC ............ *H04L 47/20* (2013.01); *H04L 45/021* (2013.01); *H04L 45/44* (2013.01); *H04L 45/54* (2013.01); *H04L 45/74* (2013.01); *H04L 61/6022* (2013.01); *H04L 63/0236* (2013.01);
(Continued)

(58) Field of Classification Search
CPC ..... H04L 47/20; H04L 45/54; H04L 61/6022; H04L 63/20
See application file for complete search history.

(56) References Cited

U.S. PATENT DOCUMENTS 9,369,426 B2  6/2016  Koponen et al.
9,787,605 B2  10/2017  Zhang et al.
(Continued)

OTHER PUBLICATIONS

Trey Tyler, Sr., Solutions Strategist. Understanding Layer 2 Extensions for the Hybrid Cloud, VMware Cloud Provider Team dated Apr. 25, 2017.
(Continued)

*Primary Examiner* — Sm A Rahman

(57) ABSTRACT

In some embodiments, a first network device in a first site sets a first IP address for an interface of the first network device to a value of a second IP address of a second network device in a second site. Policies are added in a policy table to cover IP addresses used in the second site and a specific route for a third IP address associated with a first workload migrated from the second site to the first site is added into a routing table. The first workload is on a stretched network that is coupled via a layer 2 channel. The policy table configures the first network device to send a second packet from the first workload to a third workload in the second site via the layer 2 channel when an IP address for the third workload does not match an eligible route in the routing table.

20 Claims, 13 Drawing Sheets

(51) Int. Cl.
*H04L 101/622* (2022.01)
*H04L 45/00* (2022.01)
*H04L 45/021* (2022.01)
*H04L 45/44* (2022.01)
*H04L 45/74* (2022.01)
*H04L 67/1008* (2022.01)
*H04L 67/148* (2022.01)

(52) U.S. Cl.
CPC .............. *H04L 63/18* (2013.01); *H04L 63/20* (2013.01); *H04L 67/1008* (2013.01); *H04L 67/148* (2013.01)

(56) References Cited

U.S. PATENT DOCUMENTS

| | | | |
|---|---|---|---|
| 10,027,584 B2 * | 7/2018 | Zhang | H04L 61/103 |
| 10,153,918 B2 | 12/2018 | Olmsted-Thompson | |
| 10,250,685 B2 | 4/2019 | Srinivasan et al. | |
| 10,374,827 B2 | 8/2019 | Wang et al. | |
| 10,511,459 B2 | 12/2019 | Sharma et al. | |
| 2006/0229896 A1 * | 10/2006 | Rosen | G06Q 10/1053 |
| | | | 705/321 |
| 2016/0380893 A1 * | 12/2016 | Chopra | H04L 43/12 |
| | | | 370/392 |
| 2018/0062993 A1 | 3/2018 | Wu et al. | |
| 2019/0103993 A1 | 4/2019 | Cidon et al. | |
| 2019/0104035 A1 | 4/2019 | Cidon et al. | |
| 2019/0104050 A1 | 4/2019 | Cidon et al. | |
| 2019/0104413 A1 | 4/2019 | Cidon et al. | |
| 2019/0158605 A1 | 5/2019 | Markuze et al. | |
| 2019/0268421 A1 | 8/2019 | Markuze et al. | |
| 2020/0059411 A1 | 2/2020 | Olmsted-Thompson | |
| 2020/0110625 A1 | 4/2020 | Warnicke et al. | |
| 2021/0314265 A1 | 10/2021 | Zhu et al. | |
| 2021/0314358 A1 | 10/2021 | Zhu et al. | |

OTHER PUBLICATIONS

Related U.S. Appl. No. 16/886,575, filed May 28, 2020 (unpublished).

Notice of Allowance dated Sep. 15, 2021; Related U.S. Appl. No. 16/886,575, filed May 28, 202; (14 pgs.).

* cited by examiner

POLICY-BASED PROXIMITY ROUTING

CROSS REFERENCE TO RELATED APPLICATIONS

Pursuant to 35 U.S.C. § 119(e), this application is entitled to and claims the benefit of the filing date of U.S. Provisional App. No. 63/005,982 filed Apr. 6, 2020, the content of which is incorporated herein by reference in its entirety for all purposes.

BACKGROUND

Heterogeneous sites may combine public cloud services and traditional on-premise data center computing resources. The on-premises data center and a public cloud system may be connected through a layer 2 virtual private network (VPN) and a layer 3 VPN. The systems permit workloads, such as virtual machines, to be rapidly moved from the on-premise data center to the public cloud system. Network extension, in which networks are created that stretch across both the on-premises data center and the cloud system, enables seamless workload migration by allowing connections to existing networks in the on-premise data center to be kept when workloads are moved to the cloud system. However, traditional network extension can result in undesirable traffic patterns, such as asymmetric routes, in which traffic between sources and destinations that coexist within the cloud system and the on-premise data center is routed in different paths from the cloud system to the physically-separate data center and then back again to the cloud system.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
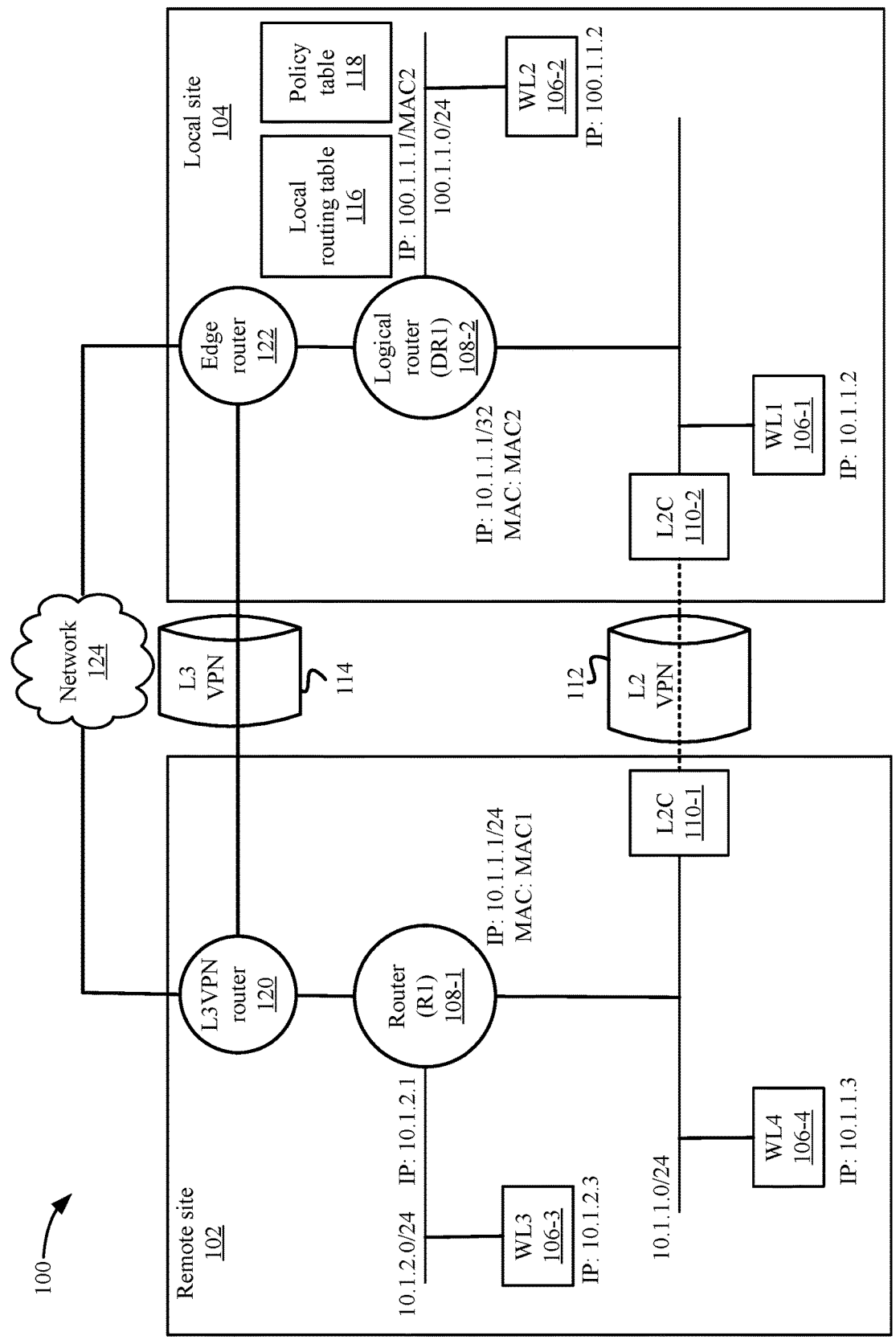
FIG. 1 depicts a simplified system for performing policy-based proximity routing according to some embodiments.

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

Some embodiments provide policy-based proximity routing techniques for traffic over stretched networks across multiple sites, such as a remote site and a local site (e.g., an on-premises data center and a cloud system). The policy-based proximity routing techniques eliminate asymmetric routing paths between workloads in the local site and the remote site such that the traffic paths taken between the local site and the remote site are symmetric. Additionally, the policy-based proximity routing techniques may avoid changing any configuration in the remote site to make the routes symmetric, which is desirable because network management of the remote site may be more difficult than the local site.

In some embodiments, the routing techniques allow the remote site to route packets between a migrated workload on a stretched network in the local site and workloads in the remote site in symmetric paths. The local site sends traffic from the migrated workload in the local site through a layer 2 VPN channel to the remote site. The techniques use layer 3 handling to determine a policy that causes the local site to use layer 2 forwarding of the traffic from the migrated workload to the remote site instead of layer 3 routing through a layer 3 VPN. When a return packet is sent from the workload in the remote site, the packet is also sent via the layer 2 VPN channel to the workload in the local site.

To perform policy-based proximity routing, the system identifies a stretched network and sets the Internet protocol (IP) address of the layer 3 interface for a logical router in the local site as the same IP address of a router in the remote site, but the subnet mask of the IP address for the logical router in the local site is set to a value to make the IP address specific, such as the mask is set to a longest possible value. For example, a /32 route may be used when using the protocol IPv4. The /32 route in IPv4 is the most specific for a 32-bit route. However, routes other than /32 routes may be used, such as when the protocol IPv6 is being used. When a workload migrates from the remote site to the local site, the system adds a /32 route for the IP address of the migrated workload to a local routing table for the logical router. This /32 route causes the logical router to route traffic locally between a migrated workload and another workload in the local site. For example, the logical router looks up the /32 route for the migrated workload in the local routing table and knows the migrated workload is located locally, and thus forwards a packet locally to the migrated workload.

The system also generates a policy table that covers the IP address scope that is being used in the remote site. The IP address scope may be the range of IP addresses being used in the remote site. An example policy may be "10.1.1.0/24 allow", which matches IP addresses within the range specified by 10.1.1.0/24 and indicates these IP address match a policy. In some examples, a migrated workload that is on a stretched network in the local site may send a packet to a workload in the remote site, such as a workload on a non-stretched network in the remote site. The packet is directed to the logical router in the local site first. When the logical router does not find a matching route in the local routing table for the IP address of the workload in the remote site, the logical router consults the policy table to determine if there is a match of a route. When there is a match, the logical router may apply a policy that forwards the packet via the layer 2 VPN channel instead of routing the packet via the layer 3 VPN channel. For example, the logical router forwards the packet to the router in the remote site, which then forwards the packet to the workload in the remote site. When a workload in the remote site sends a return packet to the workload in the local site, the router in the remote site sends the packet through the layer 2 VPN to the workload in the local site. This results in symmetric paths through the layer 2 VPN between the local site and the remote site.

System Overview

FIG. 1 depicts a simplified system 100 for performing policy-based proximity routing according to some embodiments. System 100 includes a remote site 102 and a local site 104. In some embodiments, remote site 102 may be an on-premise data center, which may be an internal cloud system for an enterprise or a "private" cloud system in which a tenant and a cloud service provider are part of the same organization. Local site 104 may be a public cloud system that may be provided by an organization that is separate from a tenant that accesses the external cloud system. For example, the tenant may be part of an enterprise, and the external cloud system may be part of a cloud service provider that is separate from the enterprise of the tenant. The cloud service provider may provide cloud services to different enterprises and/or individuals. A hybrid cloud or heterogeneous network may be a cloud architecture in which a tenant is provided with seamless access to both remote site resources and local site cloud resources.

Local site 104 may be configured as a software defined networking (SDN) system, such as an overlay network supported by NSX™ by VMware Inc. Local site 104 may include a dedicated cloud service for a single tenant or may be configured for multiple tenants with logically isolated virtualized computing resources on a shared physical infrastructure. Remote site 102 may be a virtual network or physical network. Remote site 102 and local site 104 may communicate through a layer 2 channel and a layer 3 channel, such as a layer 2 VPN (L2 VPN) 112 and a layer 3 VPN (L3 VPN) 114. Although VPNs are discussed, other links between remote site 102 and local site 104 may be used, such as the layer 2 channel and layer 3 channel may include high-throughput, dedicated links.

Workloads 106-1 to 106-4 may be running in remote site 102 and local site 104. Workloads may refer to virtual machines that are running on a respective host, but this is one example of a virtualized computing instance or compute node. Any suitable technology may be used to provide a workload. Workloads may include not only virtual machines, but also containers (e.g., running on top of a host or guest operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers. Although a virtualized environment is described, some embodiments may be used in an environment that is not virtualized. Also, when the term workload is discussed, the term workload may also be interchanged with a host.

Workloads 106 may exist on non-stretched networks and stretched networks. A non-stretched network may not be stretched across remote site 102 and local site 104, but rather exists only in one of remote site 102 or local site 104. A stretched network, or extended network, may be stretched across a network between remote site 102 and local site 104 via layer 2 VPN 112. Layer 2 concentrators (L2C) 110-1 and 110-2 are network devices (e.g., virtual devices implemented in software, that may, for example, be incorporated into routers or hosts) that connect the stretched layer 2 network across remote site 102 and local site 104 via layer 2. Each of the L2 concentrators may be configured to bridge (e.g., bridges created by L2 concentrators 110-1 and 110-2) each connected local area network (LAN) link(s) via a wide area network (WAN) link, such as via a wide area network 124. The stretched network may be separate from a layer 3 network. Stretched networks may be created using different methods, such as creating a new network in local site 104 corresponding to an existing network in remote site 102 with the new network having the same IP address as router R1 108-1 in remote site 102, plugging a port of L2C 110-2 into the new network on local site 104 and a port of L2C 110-1 into the existing network on remote site 102, and bridging the L2C pair. Examples of stretched networks may be found in U.S. Pat. No. 10,250,685, entitled "Creating Layer 2 Extension Network in a Hybrid Cloud Computing System", filed on Aug. 29, 2017, which is incorporated herein by reference.

Layer 3 VPN router 120 in remote site 102 and edge router 122 in local site 104 provide layer 3 connectivity through wide area network 124 via a layer 3 channel, such as a layer 3 VPN 114. Layer 3 VPN router 120 and edge router 122 provide VPN connectivity over network 124 between remote site 102 and local site 104.

Router R1 108-1 performs routing functions in remote site 102. Router R1 108-1 may be a logical router or may not use virtualization. Logical router DR1 108-2 performs routing functions in local site 104. Logical router DR1 108-2 may span multiple sites, such as multiple data centers. The logical router may include a distributed component referred to as a distributed router that is distributed across hosts in the multiple sites (on one or more hosts in each site) and may also include a centralized component referred to as a service router that may perform centralized functions on an edge node, such as a network address translation (NAT), firewall services, and other services. Logical router DR1 108-2 is distributed on multiple host computing devices (e.g., hypervisors) that are running on multiple sites, such as remote site 102 and local site 104 and may be a distributed router. Logical router DR1 108-2 provides connectivity to workloads hosted on hypervisors. Further details of logical routers and logical switches are described in U.S. Pat. No. 9,369,426, entitled "DISTRIBUTED LOGICAL L3 ROUTING", filed Aug. 17, 2012, which claims priority to U.S. provisional application No. 61/524,754, filed on Aug. 17, 2011, U.S. provisional application No. 61/643,753,394, filed on May 6, 2012, U.S. provisional application No. 61/654,121, filed on Jun. 1, 2012, and U.S. provisional application No. 61/666,876, filed on Jul. 1, 2012, all which are incorporated by reference in their entirety. Another example implementation of this type of logical router architecture is described in detail in U.S. Pat. No. 9,787,605, granted Oct. 10, 2017, which is also incorporated herein by reference in its entirety.

Router R1 108-1 includes an IP address of "10.1.1.1" and a media access control (MAC) address of "MAC1". While IPv4 addressing is described hereby way of example, the principles described herein maybe adapted for any Layer 3 addressing scheme, including IPv6. The IP address of an L3 interface of logical router DR1 108-2 is assigned the same IP address as router R1 108-1, but the subnet mask of the IP address of logical router DR1 108-2 is set to a specific IP address, such as the most specific or longest for the protocol being used, (e.g. the IP address "10.1.1.1/32"). The specific IP address may be the explicit IP address assigned to logical router DR1 108-2. That is, the /32 route is the specific address of "10.1.1.1" while the /24 route of "10.1.1.0/24" represents a range of addresses because the subnet mask is less than the number of bits in the specific IP addresses. Although/32 routes are described and examples are presented using the protocol IPv4, the same concepts can be applied using other protocols, such as IPv6 using different prefix masks.

Also, workload WL1 106-1 and workload WL4 106-4 are on a stretched network that is assigned the range of IP addresses of "10.1.1.0/24". Workload WL1 106-1 includes the IP address of 10.1.1.2 and workload WL4 106-4 includes the IP address of 10.1.1.3. Router R1 108-1 includes a layer 3 interface with the IP address of 10.1.2.1 for a non-stretched network that is assigned a range of IP addresses of 10.1.2.0/24. Workload WL3 106-3 includes an IP address of 10.1.2.3 and is on the non-stretched network in remote site 102. Logical router DR1 108-2 includes an L3 interface with the IP address of 100.1.1.1 for a non-stretched network that is assigned a range of addresses of 100.1.1.0/24. Workload WL2 106-2 is on the non-stretched network in local site 104 and includes the IP address of 100.1.1.2 and.

To differentiate logical router DR1 108-2 from router R1 108-1, logical router DR1 108-2 is assigned a MAC address of MAC2, which is different from the MAC address MAC1 of router R1 108-1. Assigning the same IP address to both logical router DR1 108-2 and router R1 108-1 prevents packets from being sent to remote site 102 first and then back to local site 104. Rather, packets sent by workload WL1 106-1 are first sent to logical router DR1 108-2. This will allow local traffic in local site 104 to be sent locally, such as from workload WL2 106-2 to workload WL1 106-1 via logical router DR1 108-2.

Local routing table 116 is used by logical router DR1 108-2 to make routing decisions at layer 3. When workloads are migrated from remote site 102 to local site 104, the system adds a /32 route to local routing table 116. As discussed above, the/32 routes avoid an issue where traffic is sent to remote site 102 and back to local site 104 for migrated workloads in local site 104. For example, when logical router DR1 108-2 encounters a /32 route for a migrated workload in local routing table 116, logical router DR1 108-2 can determine that the packet should be routed locally within local site 104. For example, packets sent from workload WL2 106-2 to workload WL1 106-1 are locally routed by logical router DR1 108-2 because the /32 route in local routing table 116 indicates to logical router DR 1 108-2 that workload WL1 106-1 is located in local site 104.

Policy table 118 includes policies that cover the scope of IP addresses found in remote site 102. In some embodiments, policy table 118 adds policies that cover the ranges of IP addresses for stretched networks and non-stretched networks connected to router R1 108-1. When logical router DR1 108-2 does not find a matching route in local routing table 116, logical router DR1 108-2 consults policy table 118. If the destination IP address matches a route in policy table 118, logical router DR1 108-2 applies an associated policy for the route, which may be to send the packet through layer 2 VPN 112.

The route processing in this case processes the packet in the layer 3 processing pipeline to determine the policy, but logical router DR1 108-2 performs layer 2 forwarding of a packet to router R1 108-1. Router R1 108-1 thinks the packet is from the source workload that sent the packet. Router R1 108-1 can then forward the packet to the destination workload. When the destination workload responds and sends a packet back to the source workload, router R1 108-1 forwards the packet via the layer 2 VPN 112 to the workload on the stretched network. Accordingly, a symmetric path is taken in the communication through layer 2 VPN 112. For example, as discussed in more detail below, the paths taken for traffic between workload WL1 106-1 and workload WL3 106-3 are symmetric.

Local Routing Table and Policy Table Example

Figure 2:
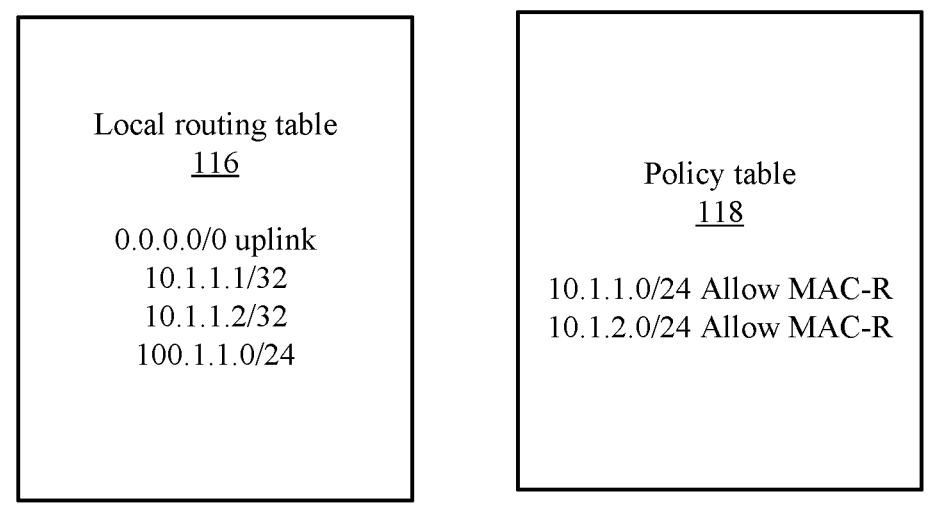
FIG. 2 depicts an example of a local routing table and a policy table according to some embodiments.

FIG. 2 depicts an example of local routing table 116 and policy table 118 according to some embodiments. Local routing table 116 is a layer 3 routing table for logical router DR1 108-2 and includes local routes for local site 104. For example, local routing table 116 may include a default route 0.0.0.0/0, which is an uplink route via network 124. The default route may be a route that is matched if no other routes in local routing table 116 are matched. Local routing table 116 may also include other routes, such as/32 routes and /24 routes. A system, such as a management plane (not shown), may add/32 routes to local routing table 116 for IP addresses of workloads that are on a stretched network in local site 104. Additionally, when workloads migrate from remote site 102 to local site 104, the management system may add a /32 route pointing to the IP address of the migrated workload. As shown, local routing table 116 includes the IP addresses of 10.1.1.1/32 for logical router DR1 108-2 and 10.1.1.2/32 for workload WL1 106-1. Additionally, the route of 100.1.1.0/24 is for the non-stretched network connected to logical router DR1 108-2 that includes workload WL2 106-2.

Policy table 118 includes routes that cover the IP address scope in remote site 102. For example, the scope may be a range of IP addresses in remote site 102. In some embodiments, different policies may be associated with the routes, such as an allow policy or a deny policy. An allow policy allows logical router DR1 108-2 to forward packets to IP addresses within the range of IP addresses associated with the route. A deny policy may be used to solve some overlapping IP address scopes between remote site 102 and local site 104. For example, if remote site 102 has an IP address scope of "10.1.1.0/16" but local site 104 has an IP address scope of "10.1.3.0/24", there may be some overlap in IP addresses due to the prefixes used. A policy in policy table 118 can be defined to distinguish between the overlap, such as a policy may be "10.1.0.0/16 allow", "10.1.3.0/24 deny". Logical router DR1 108-2 may use the longest prefix match when determining when a match of a destination IP address to a route in policy table 118 occurs. The deny policy may be used to bypass policy-based routing using policy table 118. That is, logical router DR1 108-2 may not use policy-based routing when an IP address falls within a deny route.

A MAC address is associated with the policy. The MAC address MAC-R may represent the MAC address that is required to forward the packet to eventually reach router R1 108-1. In some examples, the MAC address MAC-R is the MAC address for router R1 108-1. However, the MAC address MAC-R may be associated with L2C 110, which tunnels the packet via layer 2 VPN 112. In this case, the MAC address MAC-R may be associated with L2C 110 and is translated to the IP address of router R1 108-1 during forwarding of the packet.

Network Configuration

Figure 3:
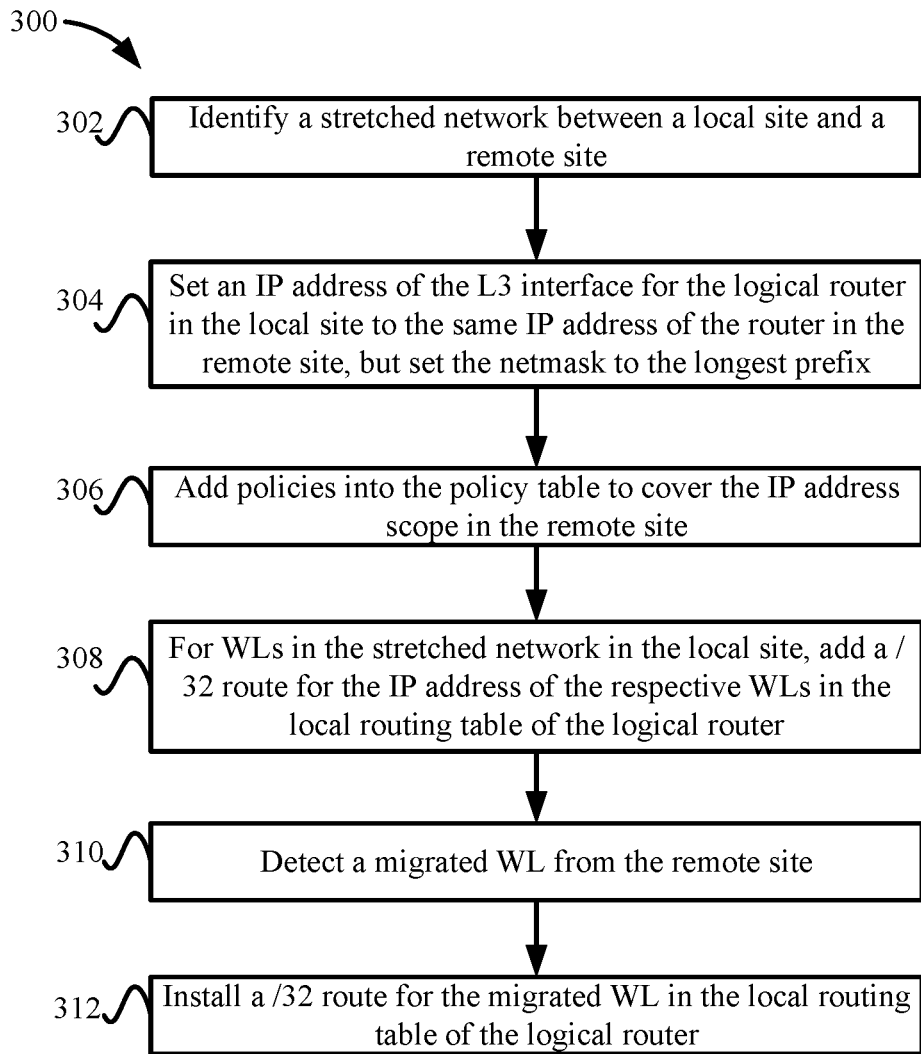
FIG. 3 depicts a simplified flowchart of a method for configuring the virtualized network in a local site according to some embodiments.

A management plane or other device in local site 104 may configure the virtualized network in local site 104 to perform policy-based proximity routing. FIG. 3 depicts a simplified flowchart 300 of a method for configuring the virtualized network in local site 104 according to some embodiments. At 302, the management plane identifies a stretched network between local site 104 and remote site 102. As discussed above, the stretched network is assigned the range of IP addresses 10.1.1.0/24 and includes workloads WL4 106-4 and WL1 106-1.

At 304, the management plane may set an IP address of the layer 3 interface for logical router DR1 108-2 to the same IP address of router R1 108-1. At 306, the management plane adds policies into policy table 118 to cover the IP address scope in remote site 102. As discussed above, routes for the range of IP addresses for the non-stretched network 10.1.2.0/24 and the stretched network 10.1.1.0/24 are added to policy table 118.

At 308, for workloads in the stretched network that are located in local site 104, the management plane adds a /32 route for the IP address of the respective workloads in local routing table 116 of logical router DR1 108-2. For example, if there are existing workloads (not shown) in local site 104 on a stretched network when the configuration occurs, the management plane adds a /32 route for the IP address for those workloads in local routing table 116.

At 310, the management plane may detect a migrated workload from remote site 102 to local site 104. For example, workload WL1 106-1 that resides on stretched network 10.1.1.0/24 may be migrated from remote site 102 to local site 104. At 312, the management plane installs a /32 route for the migrated workload in local routing table 116 of logical router DR1 108-2. As will be discussed in more detail below, the /32 route for workload WL1 106-1 in local routing table 116 makes sure that local traffic, such as from workload WL2 106-2 to workload WL1 106-1, is routed locally by logical router DR1 108-1 instead of through remote site 102.

Routing Optimization Using Policy-Based Proximity Routing

The following will describe different paths that result when different workloads communicate in system 100 using policy-based proximity routing. As will be discussed below, the paths between workloads are symmetric. Also, although workloads are described, it will be understood that packets may be sent between a host or another computing device instead of a workload.

Workload WL1 and Workload WL3

Figure 4:
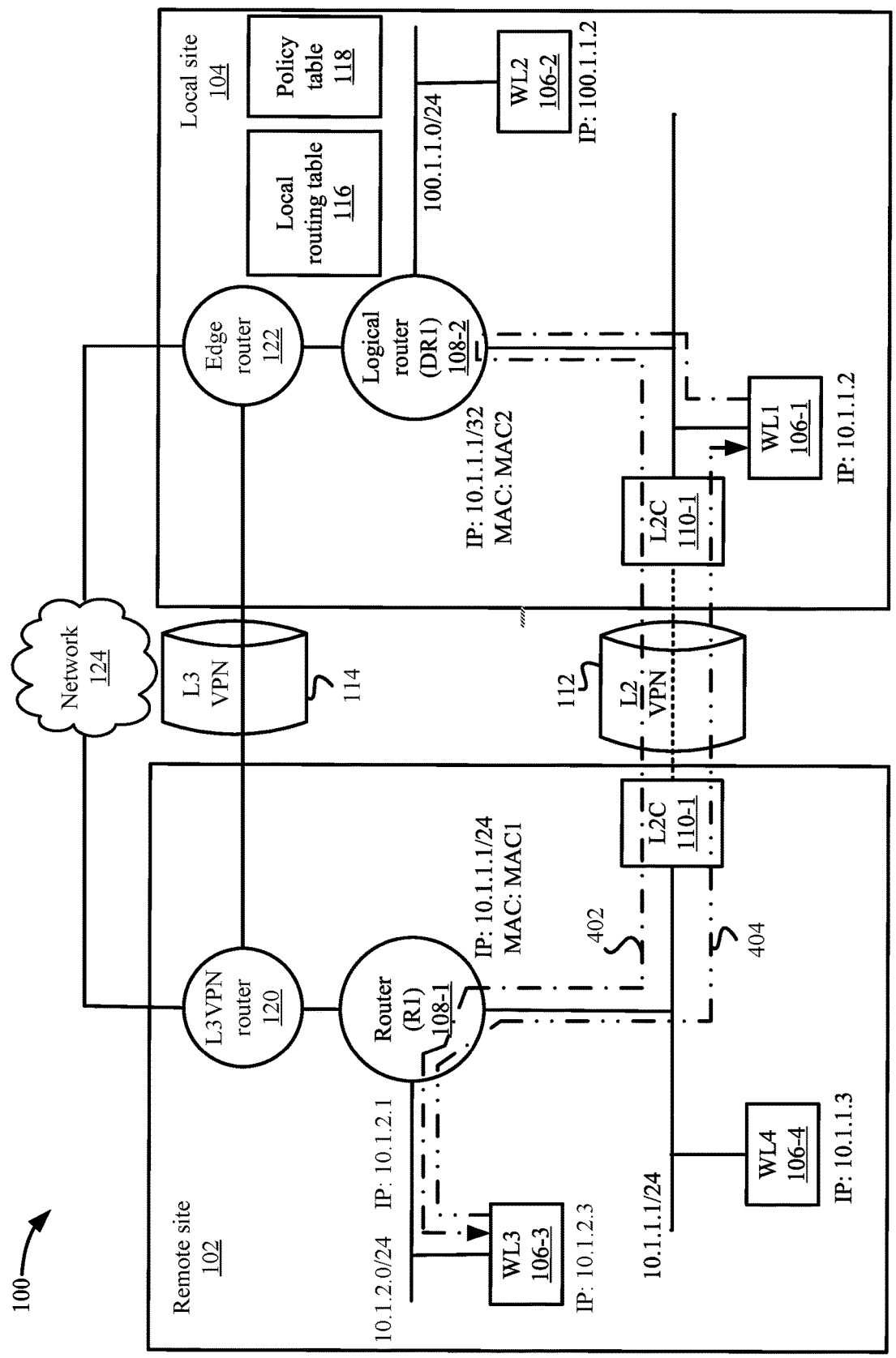
FIG. 4 depicts an example of paths taken to send packets between a workload WL1 and a workload WL3 according to some embodiments.

FIG. 4 depicts an example of paths taken to send packets between workload WL1 106-1 and workload WL3 106-3 according to some embodiments. Workload WL1 106-1 on a stretched network between remote site 102 and local site 104 and workload WL3 106-3 is on a non-stretched network in remote site 102. A packet from workload WL1 106-1 for workload WL3 is sent to logical router DR1 108-2. A corresponding route for the IP address for workload WL3 106-3 is not included in local routing table 116. Without using policy-based proximity routing, logical router DR1 108-2 would route the packet via layer 3 VPN 114 in network 124 to remote site 102. Router R1 108-1 would receive the packet and route the packet to workload WL3 106-3. However, when workload WL106-3 sends a packet to workload WL1 106-1, router R1 108-1 receives the packet and sends the packet via the stretched network to workload WL1 106-1 using layer 2 VPN 112. This is because router R1 108-1 is connected to the stretched network and is configured to route packets to workloads on the stretched network via layer 2 VPN 112. The above paths are asymmetric because one path takes the layer 3 path and another path takes the layer 2 path.

Using policy-based proximity routing, the route from workload WL1 106-1 to workload WL3 106-3 is changed from layer 3 routing to layer 2 forwarding. As can be seen, a path at 402 goes from WL1 106-1 to logical router DR1 108-2. Logical router DR1 108-2 then forwards the packet via layer 2 VPN 112 to router R1 108-1. Router R1 108-1 can then route the packet to workload WL3 106-3. At 404, the return path from workload WL3 106-3 to workload WL1 106-1 remains the same through the layer 2 VPN 112. The packet goes from workload WL3 106-3 to router R1 108-1, which forwards the packet directly to workload WL1 106-1. That is, router R1 108-1 does not route or forward the packet to logical router DR1 108-2. This is because workload WL1 106-1 is connected to the stretched network and can be reached by router R1 108-1 via layer 2 forwarding. The symmetry of paths are through layer 2 VPN 112 even though the paths may go through different network devices. The symmetry allows services to be performed at the edge of networks in remote site 102 and local site 104.

Figure 5:
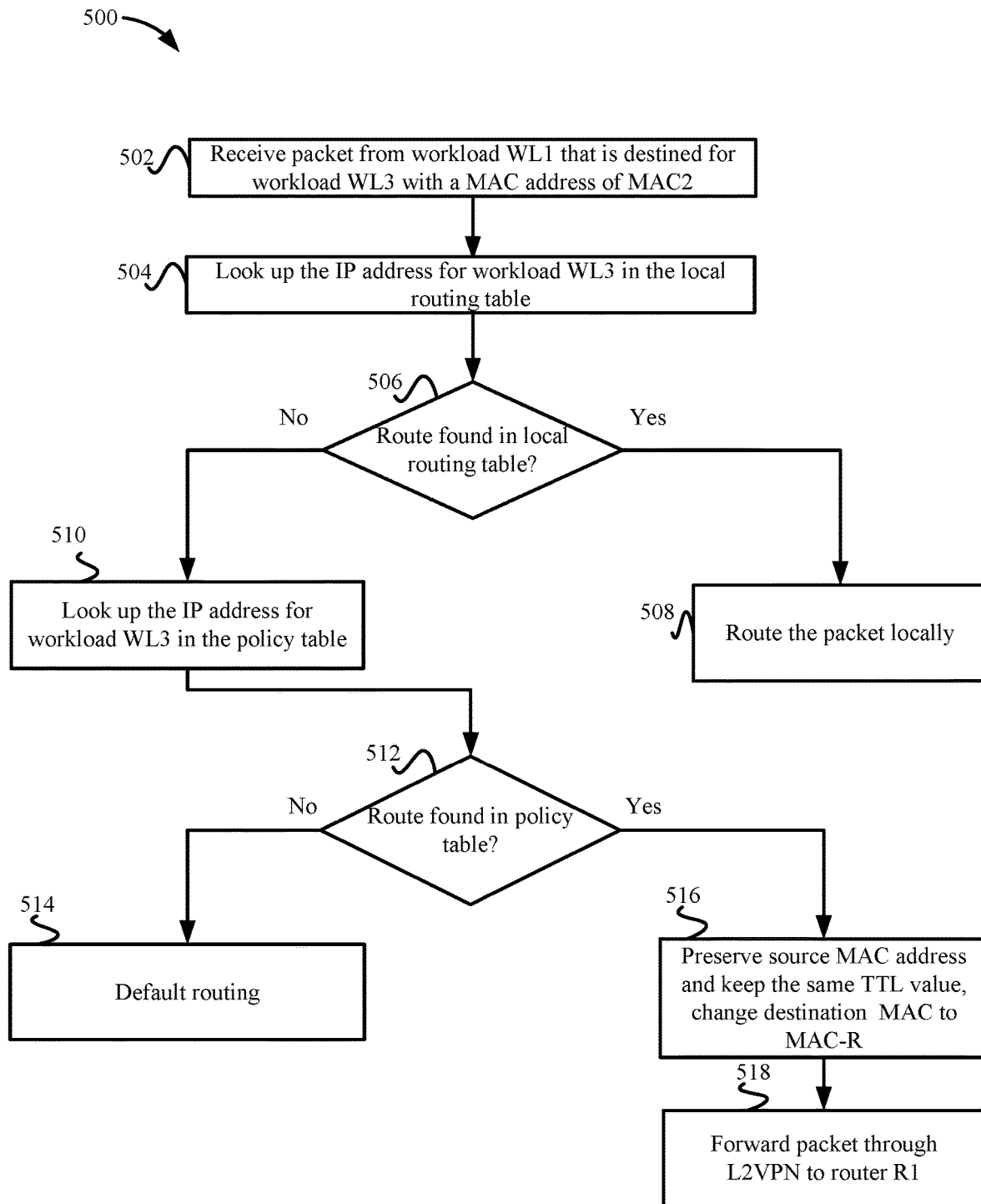
FIG. 5 depicts a simplified flowchart of a method for processing a packet received at a logical router DR using policy-based proximity routing according to some embodiments.

FIG. 5 depicts a simplified flowchart 500 of a method for processing a packet received at logical router DR1 108-2 using policy-based proximity routing according to some embodiments. At 502, logical router DR1 108-2 receives a packet from workload WL1 106-1 that includes a destination IP address 10.1.2.3 for workload WL3 106-3 ad a destination MAC address of MAC2 for logical router DR1 108-2. The use of the MAC address MAC2 forwards the packet to logical router DR1 108-2 first instead of router R1 108-1.

At 504, logical router DR1 108-2 looks up the IP address for workload WL3 106-3 in local routing table 116. If a route is found in local routing table 116 that includes the destination IP address, then this indicates that the workload is located within local site 104. In some embodiments, a matching route may be an exact match or may be a match to a range of IP addresses for a /24 route. This process will be described in more detail below, but at 508, logical router DR1 108-2 sends the packet locally within local site 104 without having the packet routed to remote site 102.

In some cases, logical router DR1 108-2 may not consider the default route when the packet is from a stretched network when attempting to find a match. This is because the default route may be set to be a default match if no other matches occur. For example, if the default route is 0.0.0/0, this route will always match the destination IP address in which case a situation where a match is not found will never occur. Accordingly, in some embodiments, logical router DR1 108-2 first determines that this packet is from a stretched network. The stretched network may be identified based on the interface from which the packet is received or from metadata. For example, the interface 10.1.1.1 is designated as being associated with a stretched network. Also, metadata may be set for the packet that indicates the packet is from a stretched network. If the packet is from a stretched network, logical router DR1 108-2 searches for a match of routes other than the default route.

When no match is found for a route in local routing table 116, at 510, logical router DR1 108-2 looks up the destination IP address for workload WL3 106-3 in policy table 118. At 512, logical router DR1 108-2 determines if a route is found in policy table 118 that matches the destination IP address. If a route is not found, at 514, logical router DR1 108-2 may perform default routing, which may route the packet via layer 3. However, if a route is found, logical router DR1 108-2 may route the packet based on an associated policy, such as by using layer 2 forwarding. For example, the IP address 10.1.2.3 matches the policy of "10.1.2.0/24 Allow MAC-R" in policy table 118 because the IP addresses is within the range of IP addresses defined by the rule. A policy may indicate that destination IP addresses of packets within this range of IP addresses are allowed and should be forwarded using layer 2 forwarding via the layer 2 connection between local site 104 and remote site 102 instead of via layer 3.

To forward the packet via layer 2, logical router DR1 108-2 may perform some actions to mask the processing of the packet by logical router DR1 108-2 such that router R1 108-1 believes the packet is sent from workload WL1 106-1. For example, at 516, logical router DR1 108-2 preserves the source MAC address of workload WL1 106-1 and keeps the same time-to-live (TTL) value for the packet. However, logical router DR1 108-2 changes the destination MAC address of the packet to MAC-R. Performing these actions hides the processing of the packet at logical router DR1 108-2. That is, the TTL value is not decremented, which hides the hop at logical router DR1 108-2. Also, keeping the source MAC address as workload WL1 106-1 (instead of changing the MAC address to an interface of logical router DR1 108-2) causes router R1 108-1 to think the packet is from workload WL1 106-1. Accordingly, the hop associated with processing the packet at logical router DR1 108-2 is not recorded. In other embodiments, the TTL value may be decremented. The TTL may be decremented if it is desirable to have a hint that one hidden hop is in the path.

At 518, logical router DR1 108-2 forwards the packet through layer 2 VPN 112 to router R1 108-1. As discussed above, the MAC address MAC-R may represent the MAC address that is required for the packet to reach router R1 108-1. In some examples, the MAC address MAC-R is the MAC address for router R1 108-1. However, the MAC address MAC-R may be associated with L2C 110 and is translated to the MAC address of MAC1 of router R1 108-1 during forwarding of the packet.

When router R1 108-1 receives the packet, router R1 108-1 routes the packet to workload WL3 106-3 in remote site 102 using the destination IP addresses. Accordingly, traffic from migrated workloads is forwarded through the layer 2 VPN 112 channel to remote site 102. The processing of the packet to be forwarded through the layer 2 VPN 112 channel is performed by logical router DR1 108-2 as part of layer 3 handling using local routing table 116. This does not change the processing at logical router DR1 108-2 because logical router DR1 108-2 has to consult local routing table 116 to determine if any packets should be forwarded locally. However, the packet received at router R1 108-1 from logical router DR1 108-2 appears as a layer 2 forwarding of the packet to remote site 102. Also, performing policy-based proximity routing does not change the configuration of remote site 102. For example, the routing from workload WL3 106-3 to workload WL1 106-1 follows a normal return path from router R1 108-1 to workload WL 1 106-1 through layer 2 VPN channel 112 as discussed above. In the return path, the packet from workload WL3 106-3 may bypass logical router DR1 108-2 as router R1 108-1 is connected to workload WL1 106-1 via the stretched network that includes workload WL1 106-1.

Workload WL2 to Workload WL1

Figure 6:
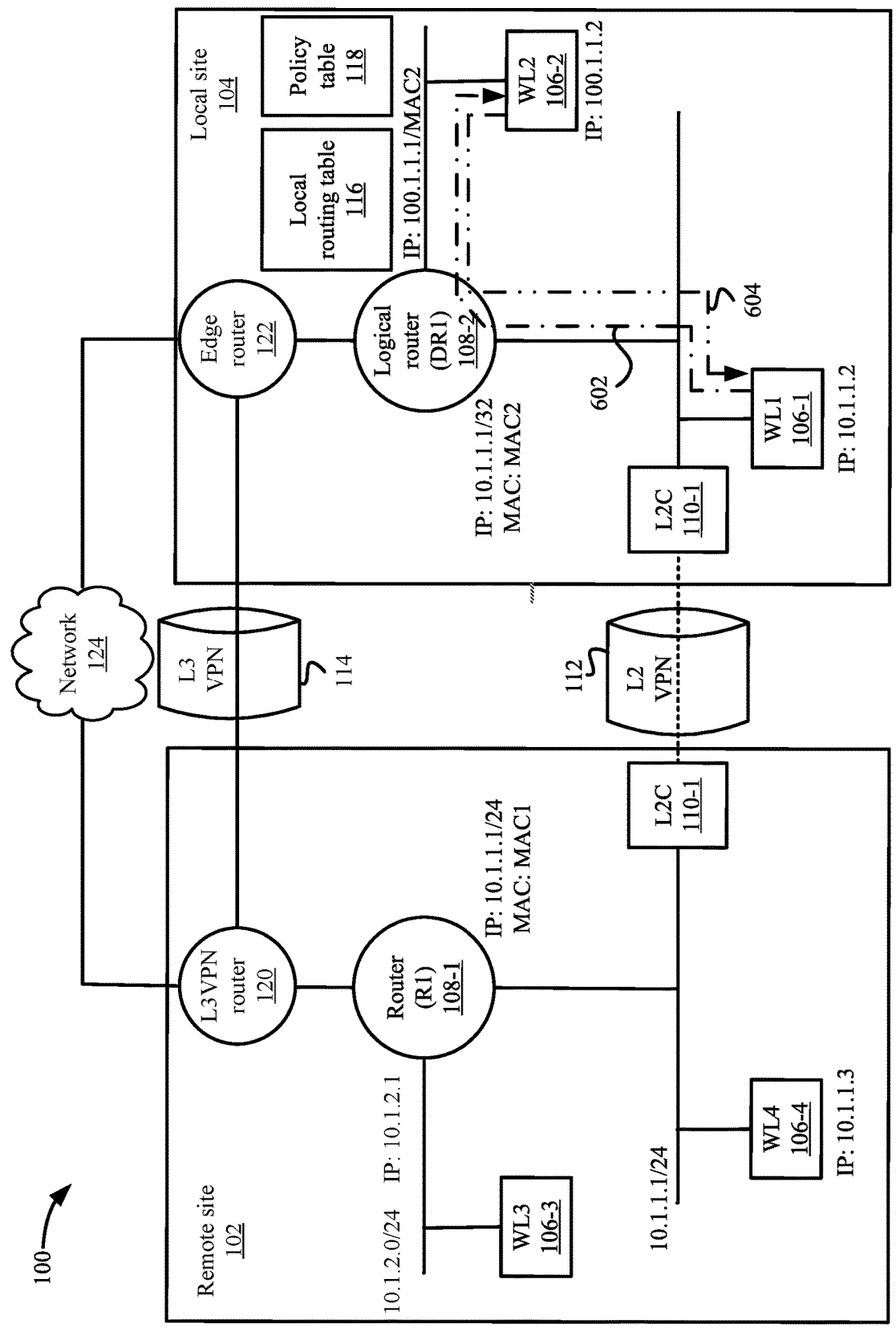
FIG. 6 depicts an example of traffic paths taken when sending packets between a workload WL2 and a workload WL1 according to some embodiments.

Packets may also be sent locally between workloads in addition to being sent in between local site 104 and remote site 102. FIG. 6 depicts an example of traffic paths taken when sending packets between workload WL2 106-2 and workload WL1 106-1 according to some embodiments. Workload WL2 106-2 is on a non-stretched network in local site 104 and workload WL1 106-1 is on a stretched network. The/32 routes in local routing table 116 are used to locally route the packet instead of having the packet being routed to remote site 102 and then back to local site 104.

When workload WL2 106-2 sends a packet with a destination IP address of 10.1.1.2 of workload WL1 106-1 and a destination MAC address of MAC2 for logical router DR1 108-2, the packet is sent in a path 602 via logical router DR1 108-2 to workload WL1 106-1. Using a /32 route in local routing table 116, logical router DR1 108-2 determines that workload WL1 106-1 is located locally in local site 104. Then, logical router DR1 108-2 forwards the packet to workload WL1 106-1 without sending the packet to remote site 102. When workload WL1 106-1 sends a return packet to workload WL2 106-2, the packet is also routed locally via logical router DR1 108-2 in a path 604 because workload 106-2 is local in local site 104.

Figure 7:
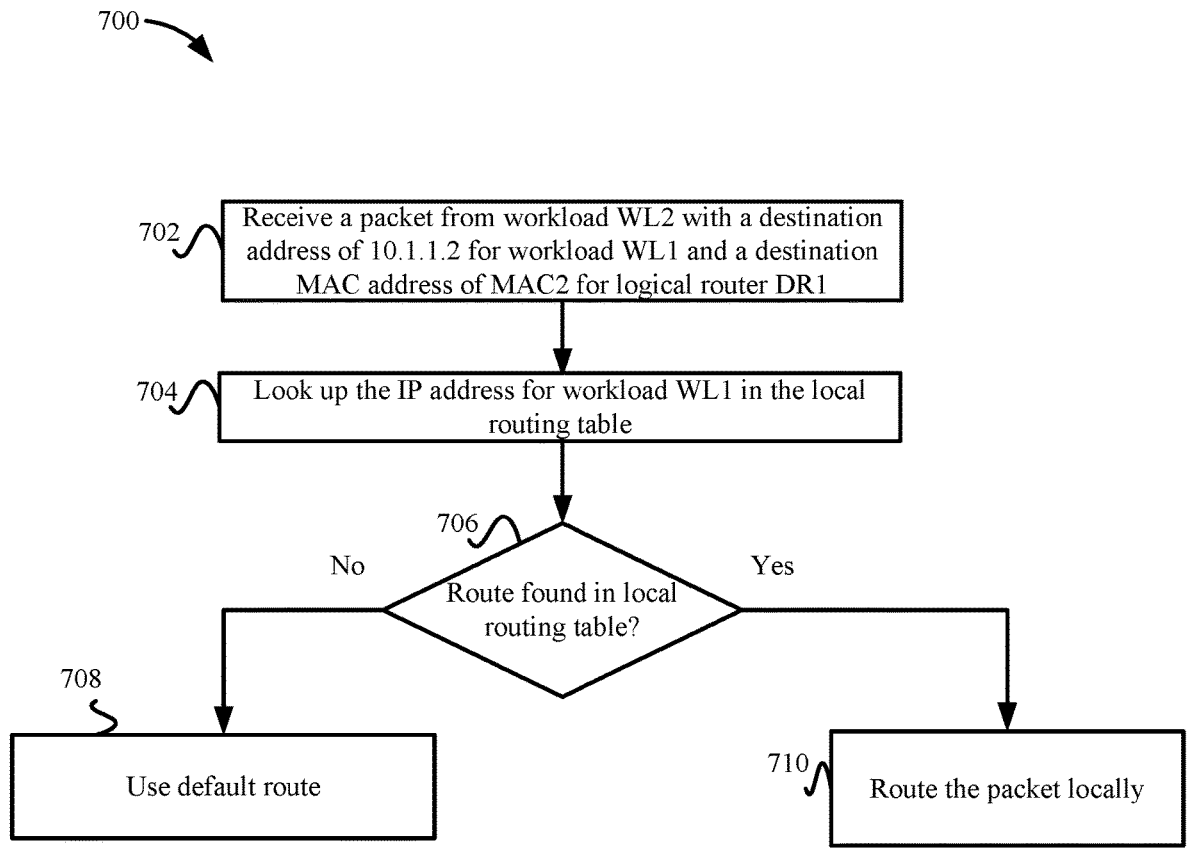
FIG. 7 depicts a simplified flowchart of the processing performed when routing packets locally to a stretched network according to some embodiments.

FIG. 7 depicts a simplified flowchart 700 of the processing performed when routing packets locally to a stretched network according to some embodiments. At 702, logical router DR1 108-2 receives a packet from workload WL2 106-2 with a destination address of 10.1.1.2 for workload WL1 106-1 and a destination MAC address of MAC2 for logical router DR1 108-2.

At 704, logical router DR1 108-2 looks up the IP address for workload WL in local routing table 116. For example, logical router DR1 108-2 looks up the destination IP address 10.1.1.2 in local routing table 116. As shown in FIG. 2, local routing table 116 includes a /32 route of 10.1.1.2/32, which may have been added when workload WL1 106-1 migrated to local site 104. At 706, logical router DR1 108-2 determines if a route is found in local routing table 116 for the destination IP address. If a route is not found in local routing table 116, at 708, logical router DR1 108-2 may perform policy-based proximity routing or use a default route to route the packet. However, if a route is found in local routing table 116, at 710, logical router DR1 108-2 routes the packet locally. For example, logical router DR1 108-2 sends the packet to workload WL1 106-1 using the destination IP address without routing the packet to remote site 102. The return path from workload WL1 106-1 to workload WL2 106-2 is processed normally by logical router DR1 108-2 as the network in which workload WL2 106-2 is connected is found in local routing table 116 and the packet is locally routed.

Route Processing from One Stretched Network to Another Stretched Network

Figure 8:
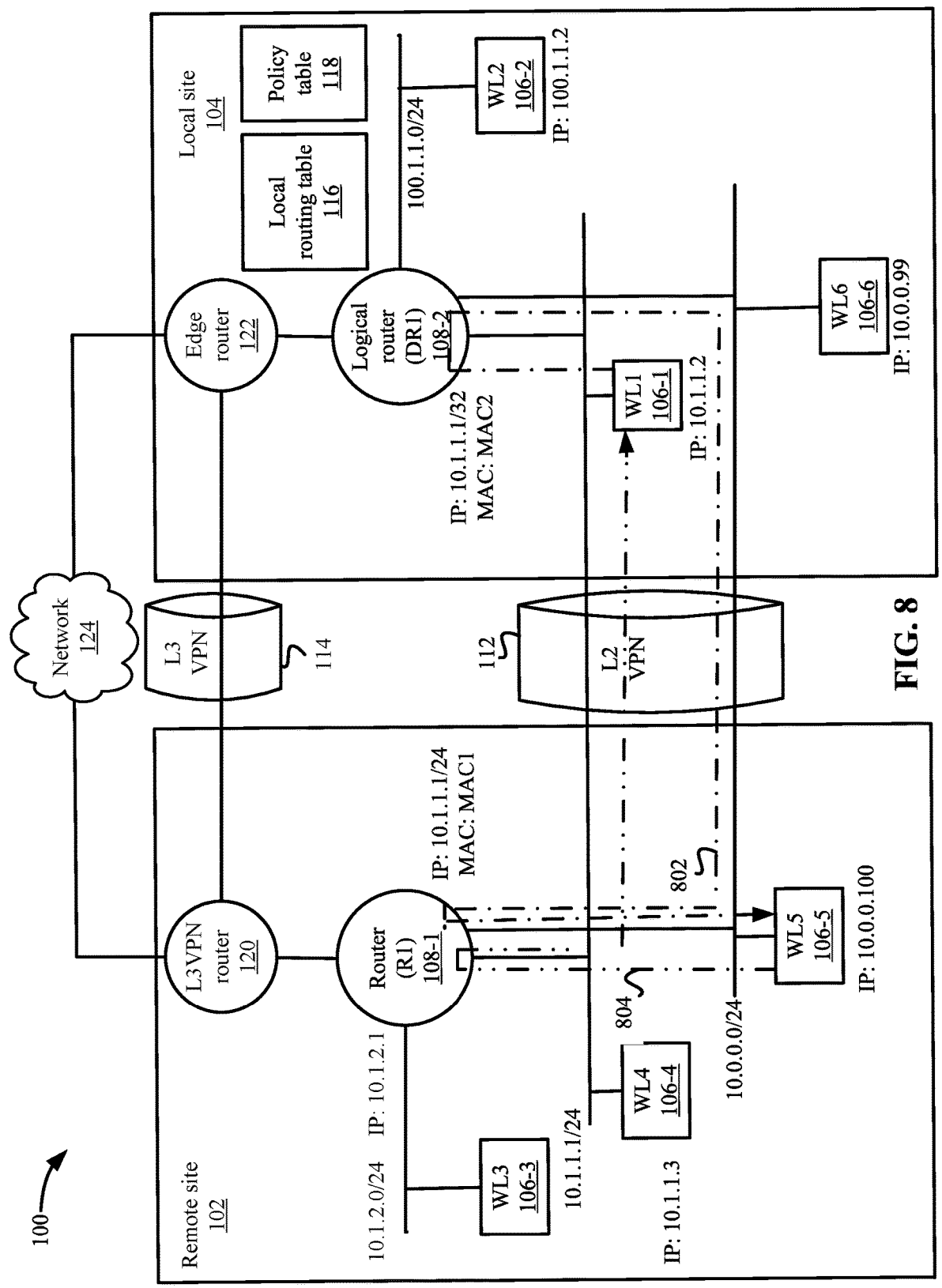
FIG. 8 depicts an example of traffic paths when routing packets from a first stretched network to a second stretched network according to some embodiments.

FIG. 8 depicts an example of traffic paths when routing packets from a first stretched network to a second stretched network according to some embodiments. As shown, a second stretched network is assigned the IP address range of 10.0.0.0/24 and is stretched across remote site 102 and local site 104. The second stretched network includes workload WL5 106-5 with an IP address of 10.0.0.100 in remote site 102 and workload WL6 106-6 with an IP address of 10.0.0.99 in local site 104. The first stretched network and the second stretched network are connected via L2 VPN 112.

When workload WL1 106-1 sends a packet for workload WL5 106-5, logical router DR1 108-2 receives the packet, and cannot find the IP address in local routing table 116. After consulting policy table 118, logical router DR1 108-2 finds a policy for the route 10.0.0.0/24. Accordingly, logical router DR1 108-2 forwards the packet in a path 802 via layer 2 VPN 112 to router R1 108-1 similar to as described above with respect to FIGS. 4 and 5 except the packet is sent to a workload on another stretched network. Router R1 108-1 receives the packet and forwards the packet to workload WL5 106-5 on the connected stretched network.

When workload WL5 106-5 sends a packet back to workload WL1 106-1, the path at 804 is followed. The path sends the packet to router R1 108-1, which then sends the packet via layer 2 VPN 112-1 to workload WL1 106-1 without going through logical router DR1 108-2. This is similar to the processing as discussed above in FIGS. 4 and 5 except the packet originates from the stretched network instead of a non-stretched network. The above paths are also symmetric similar to the paths in FIG. 4.

Packet Flow from Workload WL2 to Workload WL4

Figure 9:
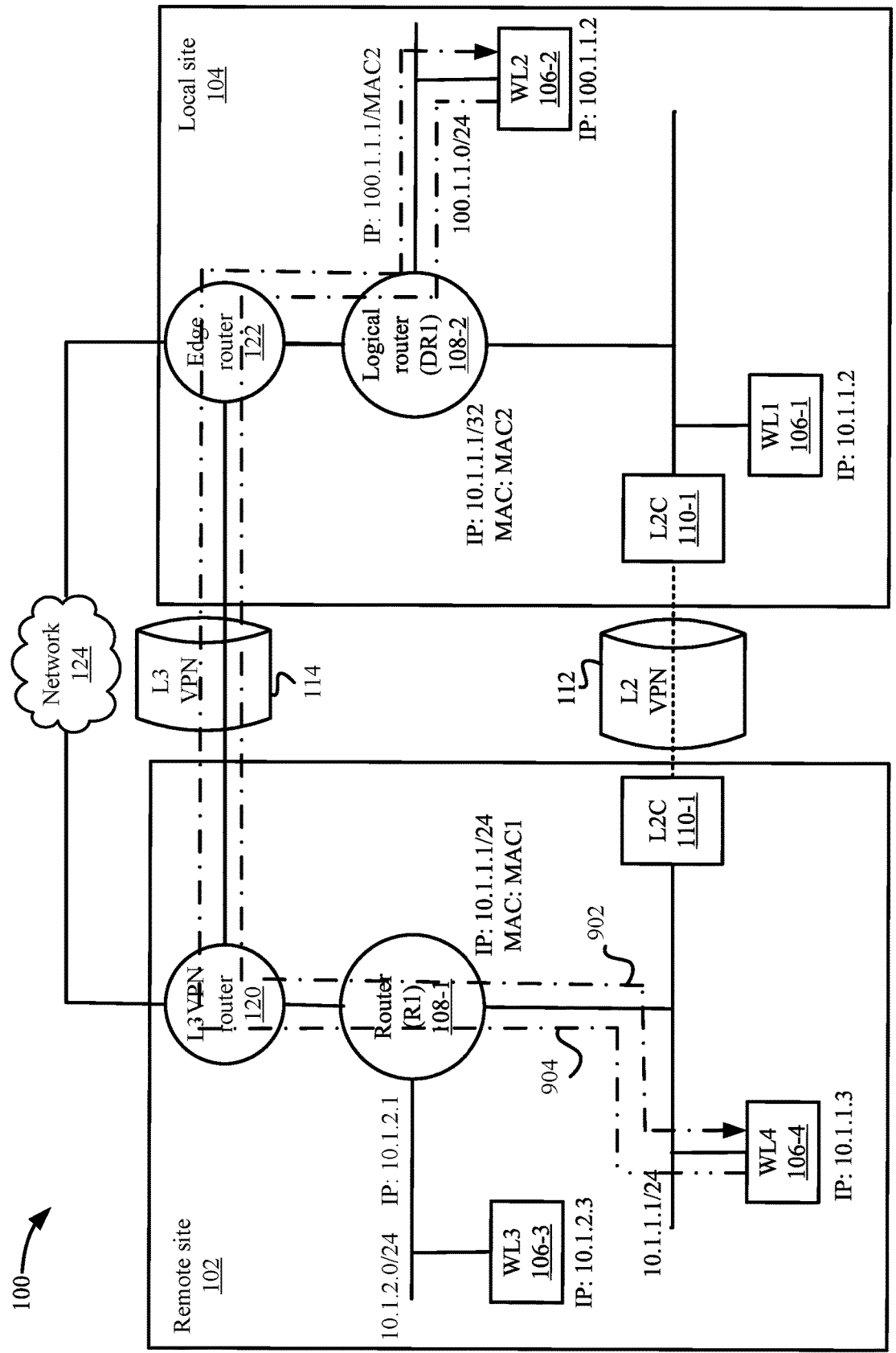
FIG. 9 depicts an example of traffic paths when routing packets between the workload WL2 on a non-stretched network in the local site to a workload WL4 on a stretched network in a remote site according to some embodiments.

FIG. 9 depicts an example of traffic paths when routing packets between workload WL2 106-2 on a non-stretched network in local site 104 to workload WL4 106-4 on a stretched network in remote site 102 according to some embodiments. Workload WL2 106-2 may send a packet that goes through the path at 902 to logical router DR1 108-2. Logical router DR1 108-2 looks up the IP address in local routing table 116. Because workload WL2 106-2 is in a non-stretched network, policy-based proximity routing does not apply to this packet. For example, logical router DR1 108-2 may be configured to not apply policy-based proximity routing to packets received from workloads on non-stretched networks. In this case, the default route is eligible to be matched and the default route is the matching route because the IP address of 10.1.1.3 is not found in a route in local routing table 116. This is because workload WL4 106-4 is not located in local site 104 and has not had a /32 route added to local routing table 116. Accordingly, logical router DR1 108-2 sends the packet via layer 3 VPN 114 in network 124. The packet is processed by layer 3 VPN router 120 and received at router R1 108-1. Router R1 108-1 forwards the packet to workload WL4 106-4. The same path is used when workload WL4 106-4 sends the packet back to workload WL2 106-2. For example, at 904, workload WL4 106-4 sends the packet to router R1 108-1, which routes the packet via layer 3 because workload WL2 is on a non-stretched network in local site 104 (e.g., the destination IP address is not in the local routing table of router R1 108-1). Layer 3 VPN router 120 routes the packet via layer 3 VPN 114 in network 124 to edge router 122, which sends the packet to logical router DR1 108-2. Logical router DR1 108-2 can then forward the packet to workload WL2 106-2. The paths shown at 902 and 904 are also symmetric through L3 VPN 114.

Conclusion

Accordingly, using policy-based proximity routing, traffic paths taken between local site 104 and remote site 102 are symmetric through either L2 VPN 112 or L3 VPN 114. This is important when providing services that require symmetric routes between workloads, such as firewall services. The policies are used when communicating with workloads in remote site 102 to steer traffic from a workload on a stretched network to the layer 2 VPN. Also, /32 routes are added to local routing table 116 to forward packets sent within local site 104 without sending the packets to remote site 102. The above packet processing can be performed without adjusting the configuration of remote site 102. Additionally, when using policy-based proximity routing, the paths do not need to use the layer 3 VPN.

Site Aware Policy-Based Proximity Routing

Figure 10:
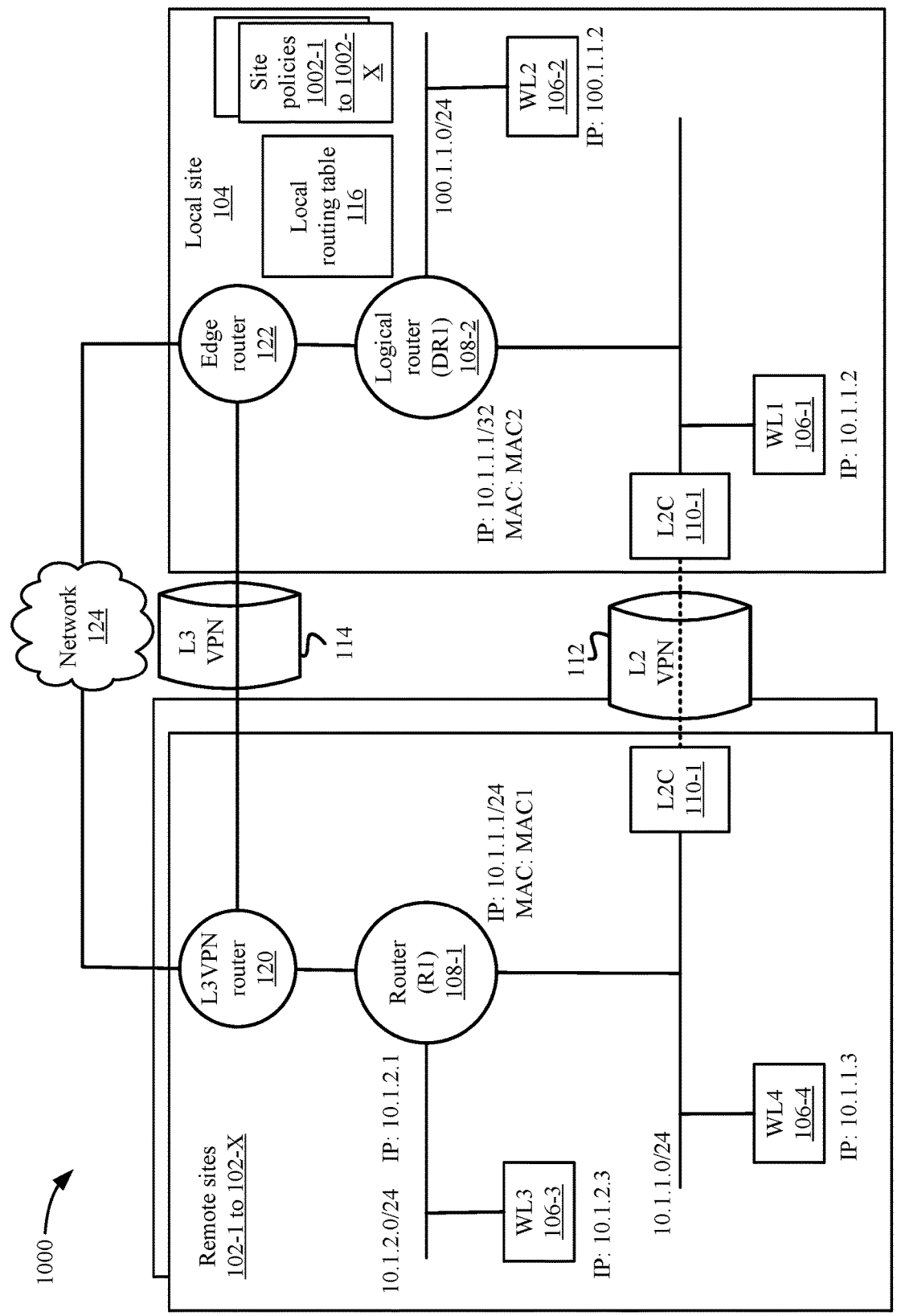
FIG. 10 depicts a simplified system for performing site aware policy-based proximity routing according to some embodiments.

A tenant may have multiple remote sites. In this case, using policy table 118 may not be possible because IP addresses in different remote sites for the same tenant may be the same or overlapping. Also, it is possible that a stretched network may stretch among local site 104 and multiple remote sites 102. To support multiple sites, local site 104 may use site aware policy-based proximity routing. FIG. 10 depicts a simplified system 1000 for performing site aware policy-based proximity routing according to some embodiments. System 1000 is similar to system 100 described above; however, multiple remote sites 102-1 to 102-X are included. Remote sites 102-1 to 102-X may be associated with a same tenant. In some embodiments, a stretched network, such as the network assigned the IP address range 10.1.1.0/24 may be stretched across multiple remote sites 102 and local site 104 that are not stretched across the other site. In addition, each remote site 102 may have respective stretched networks with local site 104. Because IP addresses may overlap between remote sites 102 and networks may stretch across multiple remote sites 102, local site 104 cannot use a single policy table 118 for multiple sites as described above. Rather, local site 104 uses site specific policies 1002. For example, each remote site 102-1 to 102-X may have an associated site policy 1002-1 to 1002-X.

Figure 11:
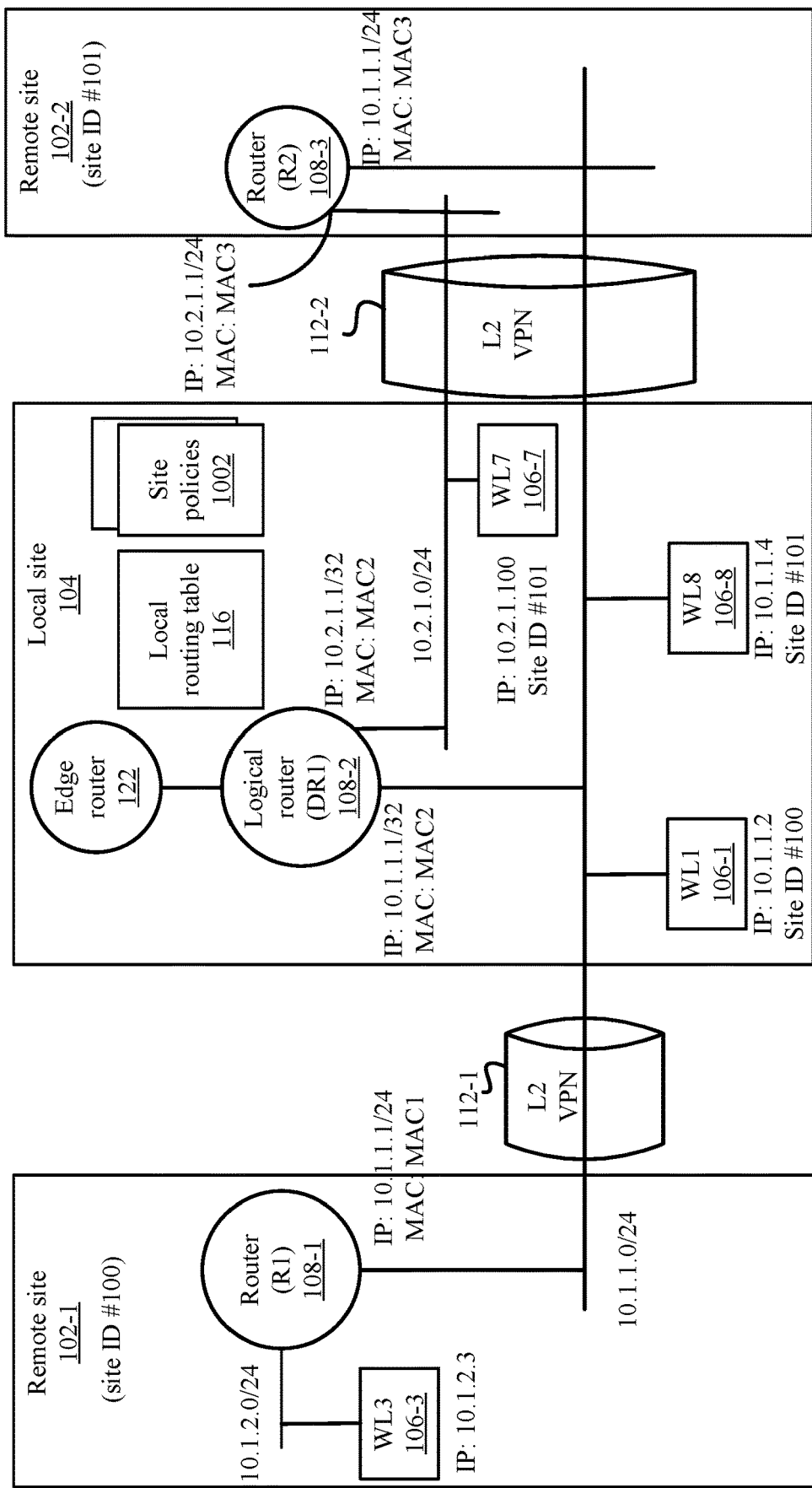
FIG. 11 depicts a more detailed example of multi-site system according to some embodiments.

FIG. 11 depicts a more detailed example of multi-site system 1000 according to some embodiments. Layer 3 connections between remote site 102-1 and remote site 102-2 with local site 104-4 are not shown, but each remote site may have a layer 3 VPN channel with local site 104.

A first stretched network assigned with the IP address range of 10.1.1.1/24 may be stretched across remote site 102-1, local site 104, and remote site 102-2. The stretched network may be stretched across a layer 2 VPN 112-1 and between remote site 102-1 and local site 104 and a layer 2 VPN 112-2 between local site 104 and remote site 102-2. A workload WL1 106-1 may have migrated to local site 104 from remote site 102-1. Workload WL1 106-1 is assigned a site ID of #100, which corresponds to remote site 102-1. Another workload WL8 106-8 may have been migrated from remote site 102-2 to local site 104 on the same stretched network as workload WL1 106-1. Workload WL8 may be assigned the site ID #101 to differentiate the workloads that are migrated from different remote sites.

Logical router DR1 108-2 includes an IP address for an L3 interface of 10.1.1.1/32, which is the same IP address as a router R1 in remote site 102-1. Logical router DR1 108-2 includes a different MAC address of MAC2 compared to the MAC address of router R1 108-1 of MAC1. Router R2 108-3 in remote site 102-2 may also include the same IP address as logical router DR1 108-2, but a different MAC address of MAC3.

A second stretched network between remote site 102-2 and local site 104 is assigned the IP address range of 10.2.1.0/24. A workload WL7 106-7 has migrated from remote site 102-2 to local site 104 on the stretched network. Workload WL7 106-7 is assigned the site ID of #101 and maintains the same IP address that was used in remote site 102-2 of 10.2.1.100. Logical router DR1 108-2 includes a layer 3 interface with the same IP address as another interface of router R2 108-3 (or another router) in remote site 102-2 of 10.2.1.1/32 and the MAC address of MAC2. Different configurations to implement the multiple stretched networks may be appreciated.

Figure 12:
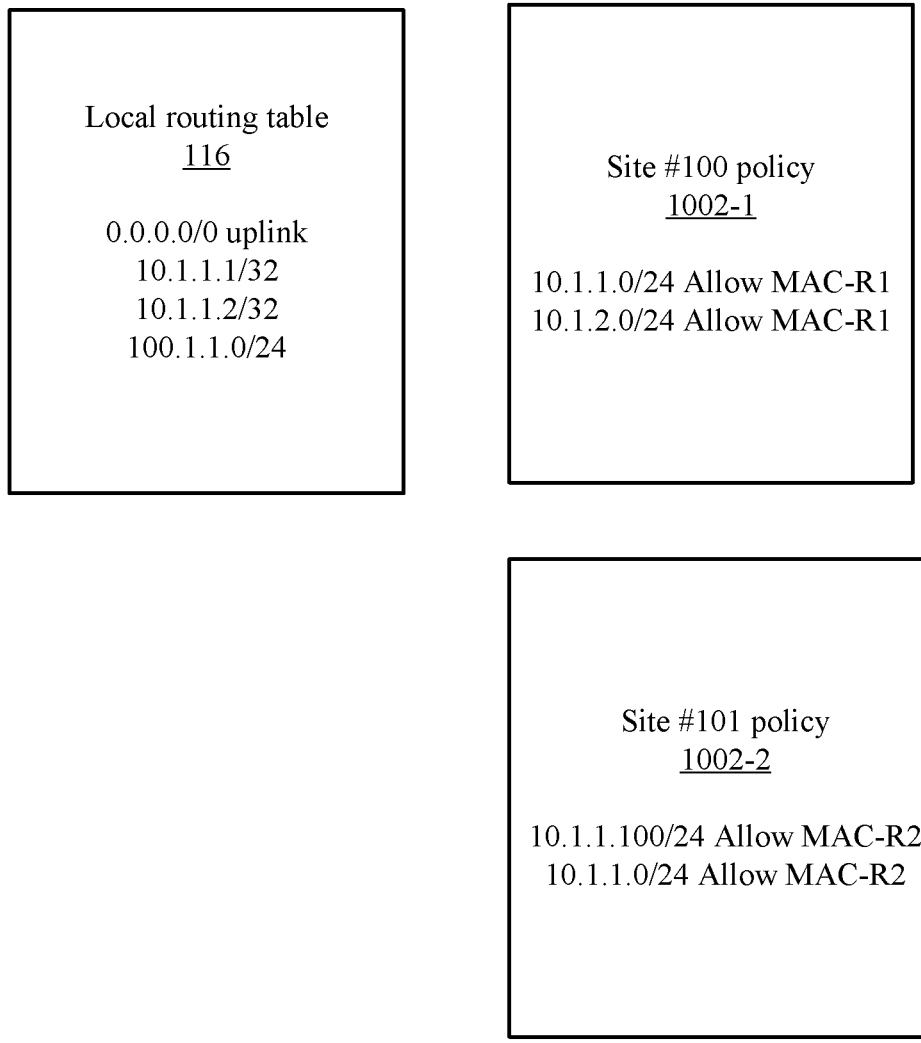
FIG. 12 depicts examples of site policies according to some embodiments.

FIG. 12 depicts examples of site policies 1002 according to some embodiments. A management plane may maintain the site-specific policies 118 for site ID #100 and site ID #101. Local routing table 116 may be similar to the routing table discussed above and include/32 routes for workloads that have been migrated to local site 104. The/32 routes may be added for workloads that are migrated from all remote sites 102. For example, /32 routes are added for workload WL1 106-1 (e.g., 10.1.1.2/32), workload WL8 106-9 (e.g., 10.1.1.4/32), workload WL7 106-7 (e.g., 10.2.1.100), and the logical interfaces for logical router DR1 108-2 (e.g., 10.1.1.1/32 and 10.2.1.1/32).

Each remote site 102 may be associated with a unique site identifier which identifies the remote site, such as identifiers for a site #100 and a site #101 are used for two remote sites. Additionally, site-specific policies for a site #100 and a site #101 are shown in site #100 policy 1002-1 and site #101 policy 1002-2, respectively. Site #100 policy 1002-1 includes the routes 10.1.1.0/24 and 10.1.2.0/24. These routes correspond to the IP address scope in remote site #100. The MAC address for router R1 in site #100 of MAC-R1 is included in site #100 policy 1002-1. This indicates that logical router DR1 108-2 should send the packets using MAC address MAC-R1, which sends packets to router R1 108-1.

Site #101 policy 1002-2 includes the routes 10.1.1.1.0/24 and 10.2.1.0/24. This includes the IP address scope for networks in site #101. The MAC address for a router R2 for a MAC address MAC-R2 is included in the site #101 policy. This indicates that logical router DR1 108-2 should send the packets using MAC address MAC-R2, which sends packets to router R2 108-3.

Figure 13:
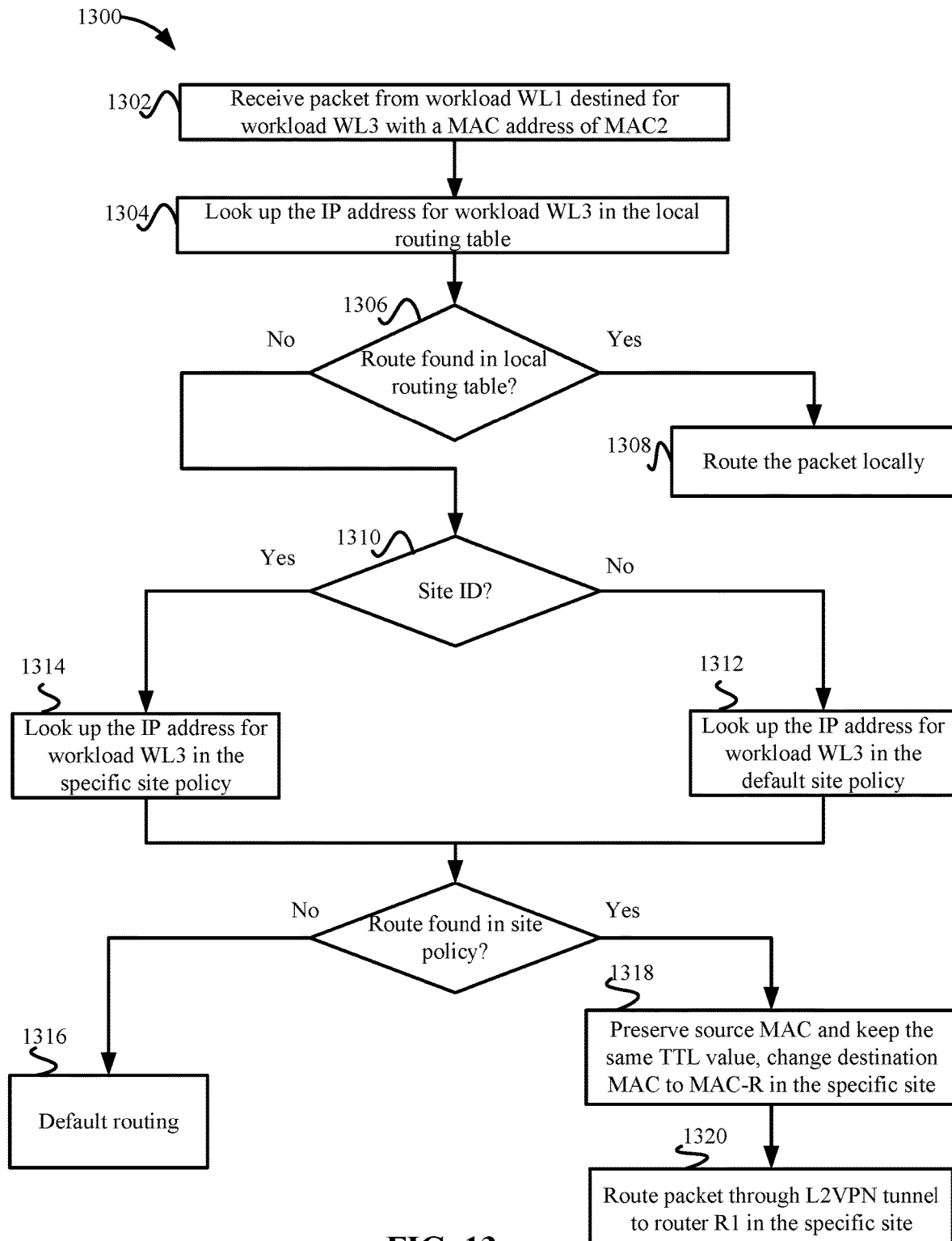
FIG. 13 depicts a simplified flowchart of a method for performing site-aware policy-based proximity routing according to some embodiments.

Logical router DR1 108-2 may use the site-specific policies as follows. FIG. 13 depicts a simplified flowchart 1300 of a method for performing site-aware policy-based proximity routing according to some embodiments. At 1302, logical router DR1 108-2 receives a packet for workload WL3 106-3 in remote site #100 with a MAC address of MAC2. At 1304, logical router DR 1 108-2 looks up the IP address for workload WL3 106-3 in local routing table 116. If the route is found, at 1308, logical router DR1 108-2 routes the packet locally. However, if the route is not found, logical router DR1 108-2 determines that the IP address 10.1.2.3 is not in the local site.

Because workload WL1 106-1 is on a stretched network, logical router DR1 108-2 may perform site-aware policy-based proximity routing. However, because multiple sites may be connected to local site 104, at 1310, logical router DR1 108-2 may determine if a site ID is associated with the packet. Logical router DR1 108-2 may determine the site ID in different ways. For example, when a stretched network does not stretch between multiple remote sites, the site ID may be associated with the logical interface of logical router DR1 108-2 that connects to the stretched network in which the packet is received. For example, one stretched network is between remote site 102-2 and local site 104. If the stretched network is assigned the IP address range of 10.2.1.0/24, logical router DR1 108-2 may determine the site ID if the packet is received on this interface at the IP address 10.2.1.1/32. The site ID on site #101 may be associated with the logical interface in this case because the network is only stretched to remote site 102-2. However, if a stretched network is stretched across multiple remote sites, then the logical interface for that stretched network may not be used to identify the site because packets may be received from multiple remote sites on the same interface. Other methods of identifying the site may be used then. For example, workloads on the stretched network may be tagged with a site ID. For example, workload WL1 106-1 is tagged with a site ID #100 when the workload migrates from remote site 102-1. Another workload WL8 106-8 may be tagged with the site ID #101 when the workload is migrated from remote site 102-2. The tagging of workloads when they migrate differentiates the workloads that are migrated from different remote sites. In some embodiments, the site ID may be carried in metadata for the packets sent from each respective workload. Metadata may be generated separate from the packet header or packet body. In other embodiments, a workload may insert the site ID in the packet, such as in a packet header. Logical router DR1 108-2 can then use the metadata to determine the site ID. Also, other methods may be used, such as a table may associate workloads to associated sites. The use of metadata and the table may be used when the stretched network connects multiple remote sites or only a single remote site with local site 104.

Referring back to FIG. 13, if a site ID is not associated with a packet, at 1312, logical router DR1 108-2 looks up the IP address for workload WL3 106-3 in the default site policy. In this case, the processing described above for a single remote site may be used. However, if a site ID is associated with the packet, at 1314, logical router DR1 108-2 looks up the IP address for a workload WL3 106-3 in the specific site policy, such as the site policy for site #101.

When a site ID is determined, at 1316, logical router DR1 108-2 looks up the destination IP address for workload WL3 106-3 in site #100 policy table 1002-1. At 1318, logical router DR1 108-2 determines if a route is found in site #100 policy table 1002-1. If the route is not found, at 1316, logical router DR1 108-2 may perform default routing, which may route the packet via layer 3. However, if a route is found, logical router DR1 108-2 may route the packet using layer 2 forwarding. For example, the IP address 10.1.2.3 matches the policy of "10.1.2.0/24 Allow MAC-R1" in site #100 policy table 1002-1, which indicates that the destination IP address of the packet is within this range of IP addresses that are allowed and the MAC address that is used forwards the packet to router R1 108-1 of remote site 102-1 instead of router R2 108-3 of remote site 102-2. The policy of "Allow" indicates that this packet is to be sent via the layer 2 connection between local site 104 and remote site 102-1.

To forward the packet via layer 2, at 1318, logical router DR1 108-2 may perform similar actions described above to mask the processing of the packet by logical router DR1 108-2 such that router R1 108-1 believes the packet is sent from workload WL1 106-1, such as preserving the source MAC and keeping the same TTL value, and changing destination MAC to MAC-R in the specific site.

At 1320, logical router DR1 108-2 forwards the packet through layer 2 VPN 112 to router R1 108-1 in remote site 102-1. When router R1 108-1 receives the packet, router R1 108-1 routes the packet to workload WL3 106-3 in remote site 102-1. In the return path, the packet from workload WL3 106-3 may bypass logical router DR1 108-2 as router R1 108-1 includes workload WL1 106-1 in its local routing table and is connected to the stretched network that includes workload WL1 106-1.

Also, logical router DR1 108-2 may also receive a packet from workload WL8 106-8 for a workload in remote site #101. Logical router DR1 108-2 determines the site ID associated with workload WL8 106-8 is site #101. In this case, logical router DR1 108-2 uses site #101 policy 1002-2 to perform policy-based proximity routing to forward the packet to the workload in site #101. A similar process is used as described above. However, the MAC address is MAC-R2, which forwards the packet to router R2 108-3.

In another scenario, logical router DR1 108-2 may also receive a packet from workload WL7 106-7 for a workload in remote site #101. The packet is received at the interface with the IP address 10.2.1.1/32. Logical router DR1 108-2 determines the site ID associated with workload WL7 106-7 is site #101. For example, the site ID may be associated with the interface in this case because the stretched network is between local site 104 and remote site 102-2, and not other remote sites. Alternatively, logical router DR1 108-2 may use metadata associated with the packet to determine the site ID. In this case, logical router DR1 108-2 uses site #101 policy 1002-2 to perform policy-based proximity routing to forward the packet to the workload in site #101. This process is similar to the process to forward the packet to workload WL3 106-3 in remote site 100.

Conclusion

Accordingly, a tenant may have multiple remote sites and still use policy-based proximity routing. A site ID may be used to identify a site or a policy. Then, logical router DR1 108-1 may apply the policy for the site.

EMBODIMENTS

In some embodiments, a method comprising: setting, by a first network device in a first site, a first Internet Protocol (IP) address for an interface of the first network device to a value of a second IP address of a second network device in a second site; adding a set of policies in a policy table to cover a set of IP addresses used in the second site; adding a specific route for a third IP address associated with a first workload that is migrated from the second site to the first site into a routing table for the first network device, wherein the first workload is on a stretched network between the first site and the second site that is coupled via a layer 2 channel, wherein: the specific route in the routing table configures the first network device to send a first packet from a second workload local to the first site to the first workload, and the policy table configures the first network device to send a second packet from the first workload to a third workload in the second site via the layer 2 channel between the first site when an IP address for the third workload does not match an eligible route in the routing table.

In some embodiments, the first network device is configured to review the policy table after not finding the eligible route in the routing table.

In some embodiments, the first network device includes a first Media Access Control (MAC) address and the second network device includes a second MAC address, and the second packet is sent to the IP address of the third workload and a MAC address associated with the first MAC address of the first network device.

In some embodiments, the set of IP address found in the second site are for networks connected to the second network device in the second site.

In some embodiments, the first network device keeps a MAC address for the first workload as a source MAC address for the second packet and keeps a same time to live value for the second packet when sending the second packet via the layer 2 channel.

In some embodiments, the second packet is sent to the second network device, and the second network device sends the packet to the third workload in the second site.

In some embodiments, the third workload sends a third packet for the first workload, the second network device sends the third packet to the first workload via the layer 2 channel, and paths for the first packet and the second packet are symmetric in that the paths go through the layer 2 channel.

In some embodiments, a non-transitory computer-readable storage medium containing instructions, that when executed, control a computer system to be operable for: setting, by a first network device in a first site, a first Internet Protocol (IP) address for an interface of the first network device to a value of a second IP address of a second network device in a second site; adding a set of policies in a policy table to cover a set of IP addresses used in the second site; adding a specific route for a third IP address associated with a first workload that is migrated from the second site to the first site into a routing table for the first network device, wherein the first workload is on a stretched network between the first site and the second site that is coupled via a layer 2 channel, wherein: the specific route in the routing table configures the first network device to send a first packet from a second workload local to the first site to the first workload, and the policy table configures the first network device to send a second packet from the first workload to a third workload in the second site via the layer 2 channel between the first site when an IP address for the third workload does not match an eligible route in the routing table.

In some embodiments, the first network device is configured to review the policy table after not finding the eligible route in the routing table.

In some embodiments, the first network device includes a first Media Access Control (MAC) address and the second network device includes a second MAC address, and the second packet is sent to the IP address of the third workload and a MAC address associated with the first MAC address of the first network device.

In some embodiments, the set of IP address found in the second site are for networks connected to the second network device in the second site.

In some embodiments, the first network device keeps a MAC address for the first workload as a source MAC address for the second packet and keeps a same time to live value for the second packet when sending the second packet via the layer 2 channel.

In some embodiments, the second packet is sent to the second network device, and the second network device sends the packet to the third workload in the second site.

In some embodiments, the third workload sends a third packet for the first workload, the second network device sends the third packet to the first workload via the layer 2 channel, and paths for the first packet and the second packet are symmetric in that the paths go through the layer 2 channel.

In some embodiments, a method comprising: receiving, by a first network device, a packet from a first workload that is located in a network that is stretched across a first site and a second site, wherein the first network device includes an interface associated with an Internet Protocol (IP) address that is a same IP address as a second network device in the second site, and the packet includes a destination IP address for a device in the second site; determining that the destination IP address of the packet does not match an eligible route in a routing table for the first network device; reviewing a policy table to determine that the destination IP address matches a route for a policy in the policy table, wherein the policy table includes routes to cover a set of IP addresses used in the second site; and based on the determining the route in the policy table, sending the packet through a layer 2 channel to the second network device in the second site based on the policy, wherein the second network device sends the packet to the device.

In some embodiments, the packet comprises a first packet, the device sends a second packet to the first workload, and the second network device sends the second packet to the first workload via the layer 2 channel.

In some embodiments, the first network device keeps a MAC address for the second packet as a source MAC address for the first workload and keeps a same time to live value for the packet when sending the packet via the layer 2 channel.

In some embodiments, the packet comprises a first packet, the method further comprising: receiving a second packet from a third workload on a non-stretched network in the first site; determining that the IP address of the packet matches an eligible route in the routing table for the first network device; and based on the determining the match of the eligible route in the routing table, sending the packet locally to the first workload.

In some embodiments, the eligible route in the routing table is a specific route for the IP address associated with the first workload.

In some embodiments, the method further comprising: when the first workload migrates to the first site, adding a specific route for the IP address associated with the first workload in the routing table.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
setting, by a first network device in a first site, a first Internet Protocol (IP) address for an interface of the first network device to a value of a second IP address of a second network device in a second site;
adding a set of policies in a policy table to cover a set of IP addresses used in the second site;
adding a specific route into a routing table for the first network device for a third IP address associated with a first workload when it is detected that the first workload is migrated from the second site to the first site, wherein the first workload is on a stretched network between the first site and the second site that is coupled via a layer 2 channel, wherein:
the specific route in the routing table configures the first network device to send a first packet from a second workload local to the first site to the first workload without sending the first packet to the second site, and
the policy table configures the first network device to send a second packet from the first workload to a third workload in the second site via the layer 2 channel between the first site when an IP address for the third workload does not match an eligible route in the routing table.

2. The method of claim 1, wherein:
the first network device is configured to review the policy table after not finding the eligible route in the routing table.

3. The method of claim 1, wherein:
the first network device includes a first Media Access Control (MAC) address and the second network device includes a second MAC address, and
the second packet is sent to the IP address of the third workload and a MAC address associated with the first MAC address of the first network device.

4. The method of claim 1, wherein the set of IP addresses found in the second site are for networks connected to the second network device in the second site.

5. The method of claim 1, wherein the first network device keeps a MAC address for the first workload as a source MAC address for the second packet and keeps a same time to live value for the second packet when sending the second packet via the layer 2 channel.

6. The method of claim 1, wherein:
the second packet is sent to the second network device, and
the second network device sends the packet to the third workload in the second site.

7. The method of claim 1, wherein:
the third workload sends a third packet for the first workload,
the second network device sends the third packet to the first workload via the layer 2 channel, and
paths for the second packet and the third packet are symmetric in that the paths go through the layer 2 channel.

8. A non-transitory computer-readable storage medium containing instructions, that when executed, control a computer system to be operable for:
setting, by a first network device in a first site, a first Internet Protocol (IP) address for an interface of the first network device to a value of a second IP address of a second network device in a second site;
adding a set of policies in a policy table to cover a set of IP addresses used in the second site;
adding a specific route into a routing table for the first network device for a third IP address associated with a first workload when it is detected that the first workload is migrated from the second site to the first site, wherein the first workload is on a stretched network between the first site and the second site that is coupled via a layer 2 channel, wherein:
the specific route in the routing table configures the first network device to send a first packet from a second workload local to the first site to the first workload without sending the first packet to the second site, and
the policy table configures the first network device to send a second packet from the first workload to a third workload in the second site via the layer 2 channel between the first site when an IP address for the third workload does not match an eligible route in the routing table.

9. The non-transitory computer-readable storage medium of claim 8, wherein:
the first network device is configured to review the policy table after not finding the eligible route in the routing table.

10. The non-transitory computer-readable storage medium of claim 8, wherein:
the first network device includes a first Media Access Control (MAC) address and the second network device includes a second MAC address, and
the second packet is sent to the IP address of the third workload and a MAC address associated with the first MAC address of the first network device.

11. The non-transitory computer-readable storage medium of claim 8, wherein the set of IP addresses found in the second site are for networks connected to the second network device in the second site.

12. The non-transitory computer-readable storage medium of claim 8, wherein the first network device keeps a MAC address for the first workload as a source MAC address for the second packet and keeps a same time to live value for the second packet when sending the second packet via the layer 2 channel.

13. The non-transitory computer-readable storage medium of claim 8, wherein:
the second packet is sent to the second network device, and
the second network device sends the packet to the third workload in the second site.

14. The non-transitory computer-readable storage medium of claim 8, wherein:
the third workload sends a third packet for the first workload,
the second network device sends the third packet to the first workload via the layer 2 channel, and
paths for the second packet and the third packet are symmetric in that the paths go through the layer 2 channel.

15. A method comprising:
receiving, by a first network device, a packet, wherein a first workload is located in a network that is stretched across a first site and a second site, wherein the first network device includes an interface associated with an Internet Protocol (IP) address that is a same IP address as a second network device in the second site, and the packet includes a destination IP address;

determining whether the destination IP address of the packet matches an eligible route in a routing table for the first network device;

when the destination IP address of the packet does not match the eligible route, performing:

reviewing a policy table to determine that the destination IP address matches a route for a policy in the policy table, wherein the policy table includes routes to cover a set of IP addresses used in the second site; and based on the determining the route in the policy table, sending the packet through a layer 2 channel to the second network device in the second site based on the policy, wherein the second network device sends the packet to a device;

when the destination IP address of the packet does match the eligible route, sending the packet to the first workload without sending the packet to the second site when the destination IP address is for the first workload.

16. The method of claim 15, wherein when the destination IP address of the packet does not match the eligible route:

the packet comprises a first packet, the device sends a second packet to the first workload, and the second network device sends the second packet to the first workload via the layer 2 channel.

17. The method of claim 15, wherein when the destination IP address of the packet does not match the eligible route, the first network device keeps a MAC address for the second packet as a source MAC address for the first workload and keeps a same time to live value for the packet when sending the packet via the layer 2 channel.

18. The method of claim 15, wherein the packet comprises a first packet, and the device comprises a first device, the method further comprising:

receiving a second packet from the first workload for a second device, wherein the second device is on a non-stretched network in the first site; and sending the second packet locally to the second device.

19. The method of claim 18, wherein:

the eligible route in the routing table is a specific route for the IP address associated with the first workload.

20. The method of claim 18, further comprising:

when the first workload migrates to the first site, adding a specific route for the IP address associated with the first workload in the routing table.

* * * * *